United States Patent
Matsugatani et al.

(10) Patent No.: US 7,106,817 B2
(45) Date of Patent: Sep. 12, 2006

(54) COMMUNICATION DEVICE HAVING DELAY INFORMATION CALCULATING FUNCTION

(75) Inventors: Kazuoki Matsugatani, Kariya (JP); Makoto Tanaka, Kariya (JP)

(73) Assignee: DENSO Corporation, Kariya (JP)

( * ) Notice: Subject to any disclaimer, the term of this patent is extended or adjusted under 35 U.S.C. 154(b) by 841 days.

(21) Appl. No.: 09/885,890

(22) Filed: Jun. 19, 2001

(65) Prior Publication Data

US 2002/0039347 A1    Apr. 4, 2002

(30) Foreign Application Priority Data

Jun. 30, 2000    (JP) ............................. 2000-199440

(51) Int. Cl.
*H04L 7/00*    (2006.01)
(52) U.S. Cl. .................................... 375/354
(58) Field of Classification Search ................ 375/260, 375/148, 136, 149, 150, 347, 354, 355, 365; 370/508, 509, 514
See application file for complete search history.

(56) References Cited

U.S. PATENT DOCUMENTS

| | | | | |
|---|---|---|---|---|
| 5,615,409 A | * | 3/1997 | Forssen et al. | 455/440 |
| 5,933,421 A | * | 8/1999 | Alamouti et al. | 370/330 |
| 6,058,149 A | * | 5/2000 | Sato | 375/365 |
| 6,084,928 A | * | 7/2000 | Kuwahara | 375/347 |
| 6,115,426 A | * | 9/2000 | Fujimoto et al. | 375/260 |
| 6,229,792 B1 | * | 5/2001 | Anderson et al. | 370/280 |
| 6,275,552 B1 | * | 8/2001 | Ando | 375/368 |
| 6,311,043 B1 | * | 10/2001 | Haardt et al. | 455/67.16 |
| 6,587,526 B1 | * | 7/2003 | Li et al. | 375/355 |
| 6,708,020 B1 | * | 3/2004 | Hiramatsu et al. | 455/65 |
| 6,958,987 B1 | * | 10/2005 | Herring et al. | 370/338 |

FOREIGN PATENT DOCUMENTS

| | | |
|---|---|---|
| JP | 11-298434 | 10/1999 |
| JP | 2000-165342 | 6/2000 |

* cited by examiner

*Primary Examiner*—Khanh Tran
*Assistant Examiner*—Sam K. Ahn
(74) *Attorney, Agent, or Firm*—Harness, Dickey & Pierce, PLC

(57) ABSTRACT

A communication device using orthogonal multiplexing carrier method for determining delay information of received radio waves. In this device, a known signal demodulator performs OFDM demodulation to output demodulated signal, and a divider performs a complex division of the demodulated signal with a data sector of known signal of a database for each sub-carrier. By the data section of the known signal, the computation result of the amount of shift can be determined for each of sub-carriers. A delay analytical calculation circuit uses the computation result of the amount of shift for sub-carriers to analyze the delayed waves. For delay analysis, ESPRIT method is used to determine delay information by means of computation result of the amount of shift for each sub-carrier.

2 Claims, 15 Drawing Sheets

DELAY(NORMAL)

ANALYSIS(NORMAL)

COMMUNICATION DEVICE HAVING DELAY INFORMATION CALCULATING FUNCTION

CROSS REFERENCE TO RELATED APPLICATION

This application is based on and incorporates herein by reference Japanese Patent Application No. 2000-199440 filed Jun. 30, 2000.

BACKGROUND OF THE INVENTION

1. Field of the Invention

The present invention relates to a communication device and more particularly to a communication device using a communication method of simultaneous transmission and reception of a plurality of carriers.

2. Related Art

Recently, multiplexing carrier methods are used for improving the wireless communication speed. In particular, OFDM (orthogonal frequency division multiplexing) method uses a plurality of sub-carriers (carriers) placed on a frequency axis, the interval between adjoining two sub-carriers among the plurality of sub-carriers is implemented as the theoretical minimum. The OFDM method has thereby become one good candidate of orthogonal multiplexing carrier methods that allows the usage rate of frequencies to be improved.

The data structure of OFDM signals of orthogonal multiplexing carrier method includes a guard interval at the beginning. The period of time of the guard interval (the length of the guard interval) is preset so as to be longer than the delay at the reception of OFDM signals by taking into account the wireless communication environment (for example, indoor wireless communication environment for placing a transmitter and a receiver in a room). This enables demodulation of OFDM signals when the reception has a delay, if the delay is shorter in comparison with the guard interval time.

Communication devices using such an orthogonal multiplexing carrier method are devised so as to use in an indoor wireless communication environment between the transmitter and the receiver. However, in an outdoor environment the radio wave (OFDM signals) between a transmitter and a receiver is reflected by a variety of obstacles (for example, a building), and is carried from the transmitter to the receiver through a plurality of propagation paths. The path lengths of these propagation paths differ so that the receiver receives a plurality of radio waves with various delays.

That is, a plurality of radio waves to be received (for example the direct radiation wave, delayed wave, and so on) is received by the receiver with different delays. More specifically, in an outdoor environment, the probability of estimated time of arrival of delayed waves beyond the guard interval is higher than in an indoor environment. The receiver in turn has a problem that it cannot recognize the receiving radio waves delayed far more than the guard interval time correctly as the receiving radio waves.

SUMMARY OF THE INVENTION

The present invention has been made in view of the above circumstances and has an object to provide a communication device, which determines delay information of receiving radio waves.

The present invention has another object to provide a communication device, which determines delay information of receiving radio waves and improves the propagation efficiency based on thus determined delay information.

In order to achieve the above objects, the present invention provides a communication device for receiving signals known by K carriers among N carriers, where $K \leq N$, by a communication method of simultaneously transmitting and receiving N carriers. The communication device determines fluctuation of amplitude and phase in each of K carriers that are indicative of being known signals, and determines delay information of receiving radio waves in response to the amount of fluctuation thus determined. In this manner, the delay information is determined so that the radio waves received at or after the guard interval time can be correctly recognized as the delay waves. Thus, as known signals are used for determining the delay information, no signal need to be further added.

BRIEF DESCRIPTION OF THE DRAWINGS

The above and other objects, features and advantages of the present invention become more apparent from the following detailed description made with reference to the accompanying drawings. In the drawings.

DETAILED DESCRIPTION OF THE PREFERRED EMBODIMENTS

[First Embodiment]

Figure 1:
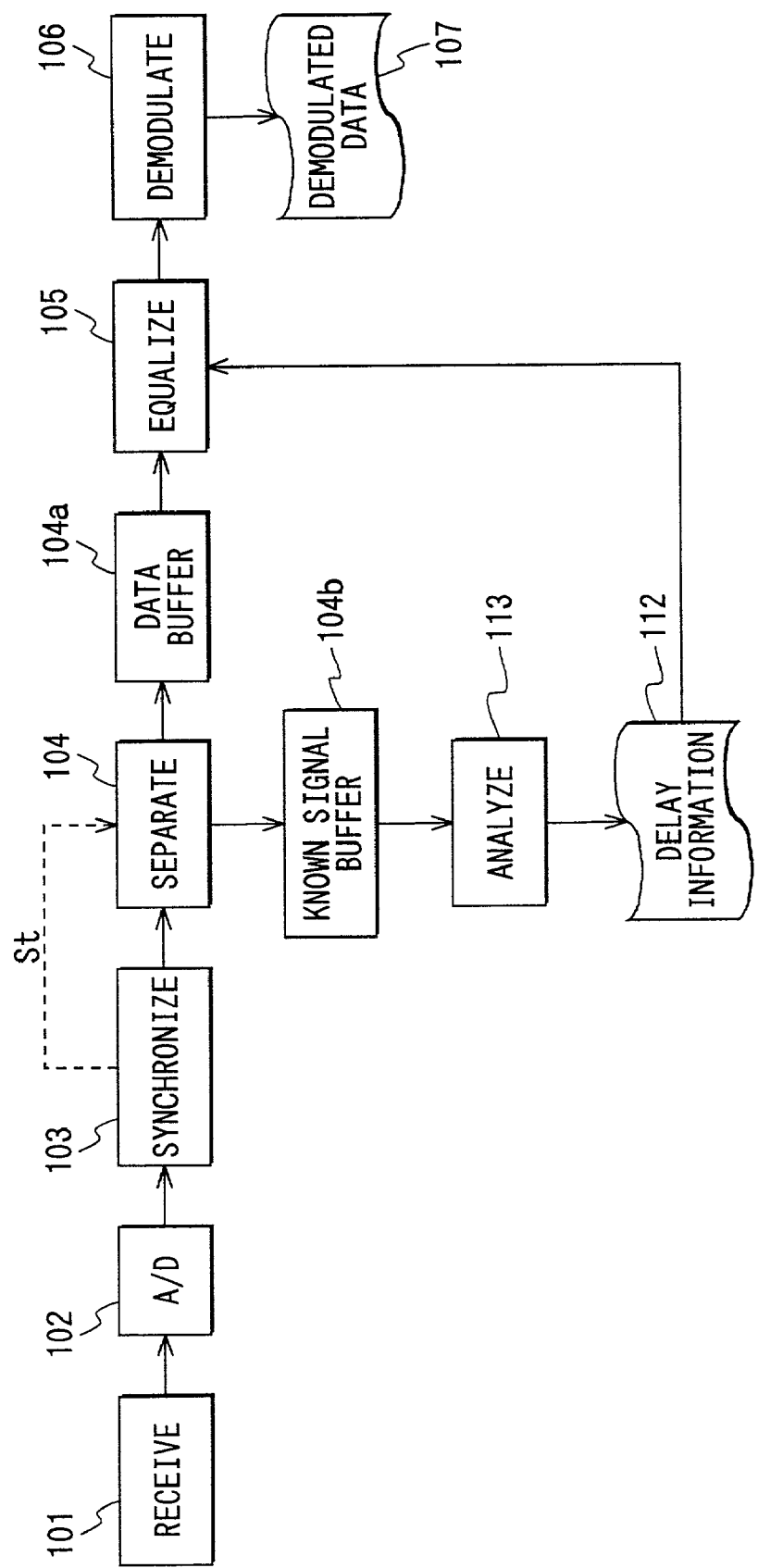
FIG. 1 is a schematic block diagram showing a circuitry in a communication device using an orthogonal multiplexing carrier method in accordance with the first embodiment of the present invention.
Figure 2:
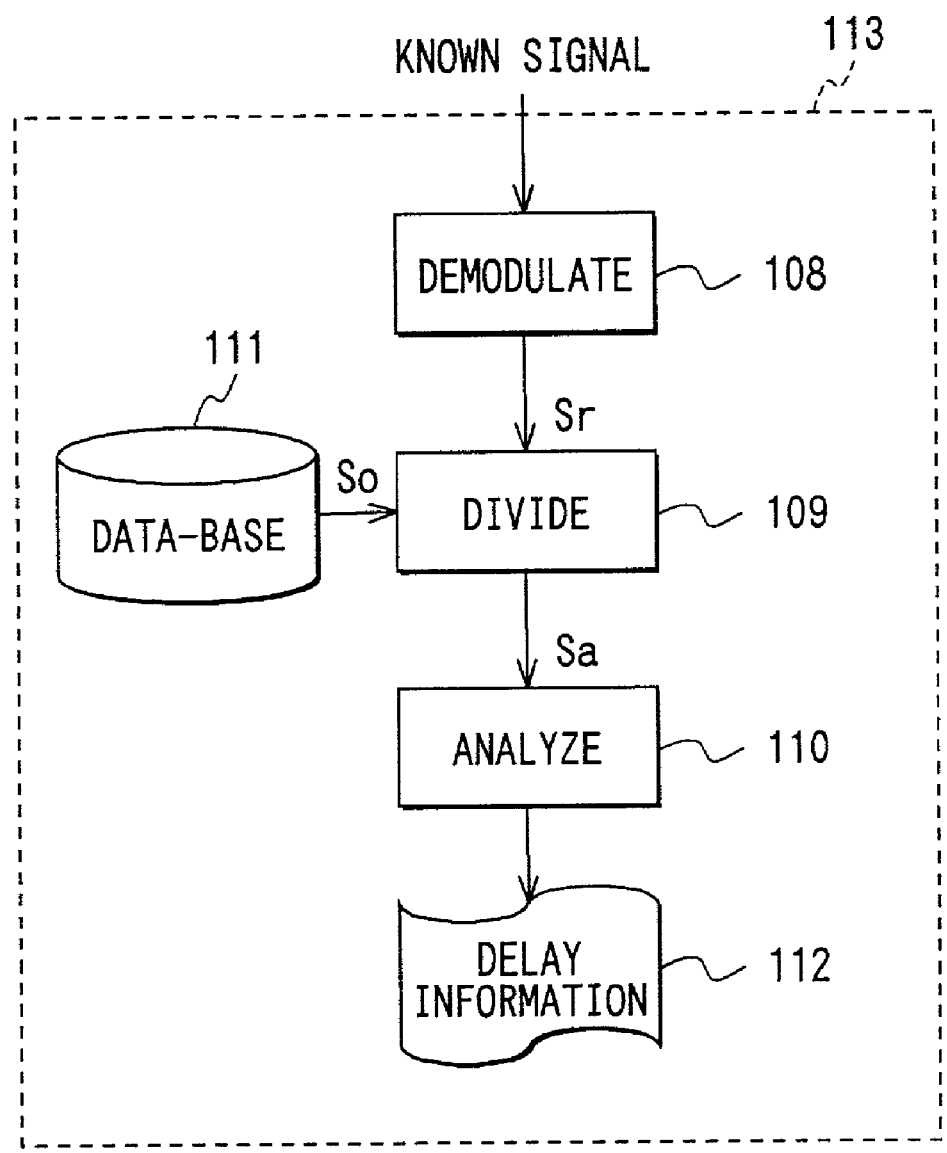
FIG. 2 is a schematic block diagram showing a circuitry in a delay analyzer circuit shown in FIG. 1.

In FIG. 1 and FIG. 2, there is shown first embodiment of a communication device of the orthogonal multiplexing carrier method in accordance with the present invention. FIG. 1 is a schematic block diagram of circuit in the communication device, while FIG. 2 is a schematic block diagram of circuitry in the delay analyzer circuit shown in FIG. 1.

The OFDM signals have a number of (N) sub-carriers placed on the frequency axis at a regular interval. The communication device of the orthogonal multiplexing carrier method is referred to as communication device hereinbelow for the sake of simplicity. In the first embodiment, a typical example of usage is assumed for the description of the present invention, wherein the communication device is used in an outdoor wireless communication environment for receiving multiplexed waves. The multiplexed wave includes a plurality of receiving radio waves (delayed waves) arriving at different delayed time from one transmitter (not shown).

Figure 3A:
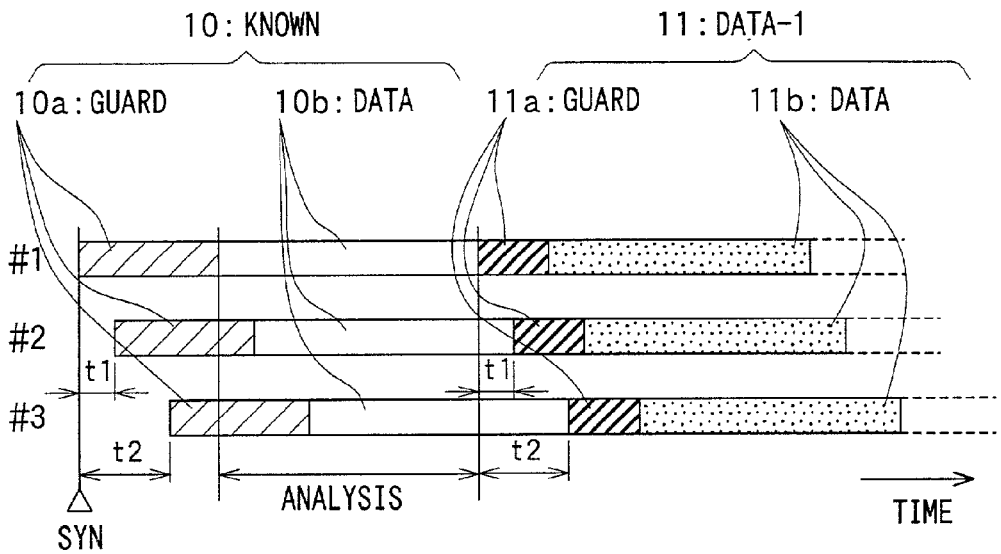
FIGS. 3A to 3C are a schematic diagram showing the data structure and delay waves of OFDM signals and timing charts indicating delayed waves, respectively.

The data structure of the OFDM signals is the type shown in number 1 of FIG. 3A. The OFDM signals shown in FIG. 3A have a known signal 10 added at the beginning of data-1 signal 11. In the known signal 10 a guard interval 10a of the known signal is added at the top (leading side) of data section 10b of the known signal. In the data-1 signal 11a guard interval Ha is added at the top (leading side) of data section 11b (information signals) of the data-1 signal. It should be noted that the known signal 10 is transmitted and received by means of N sub-carriers. More specifically, the known signal 10 is carried on all of N sub-carriers. The known signal 10 is served as the preamble of the OFDM signals.

As shown in FIG. 1, the communication device includes a receiver 101, an analog-to-digital converter 102, a synchronizer circuit 103, a known signal/data separator 104, a data buffer 104a, a known signal buffer 104b, an equalizer 105, a data demodulator 106, and a delay analyzer circuit 113. The receiver 101 receive multiplexed radio waves from its antenna to convert the OFDM signals in an RF band multiplexed signal waves into baseband OFDM signals. The analog-to-digital (A/D) converter 102 converts the baseband OFDM signals into digitized OFDM signals.

Figure 4A:
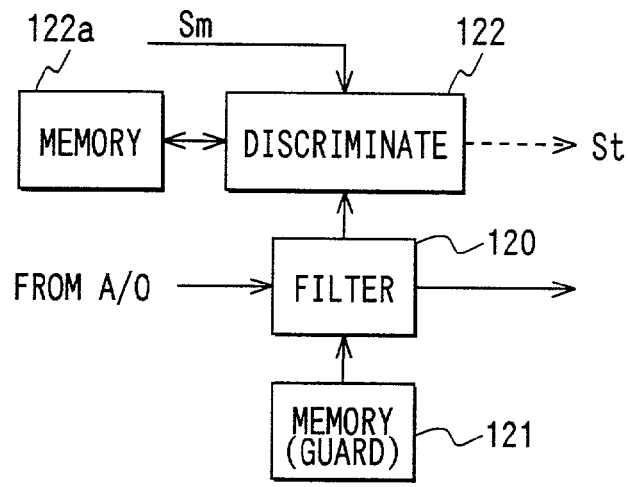
FIGS. 4A and 4B are a schematic block diagram showing a circuitry of a synchronization circuit shown in FIG. 1, and a timing chart showing the matched filter output, respectively.

The synchronizer circuit 103 includes, as shown in FIG. 4A, a matched filter 120, a memory 121, a discriminator circuit 122, and a correlative memory 122a. The matched filter 120 outputs the correlative values of the leading part of received radio waves. The memory 121 stores guard intervals 10a of the known signals (guard intervals 10a of the known signals before transmission). The discriminator circuit 122 detects the synchronization timing St as described later. The correlative memory 122a stores the filter output from the matched filter 120 as the correlative value of the leading part of the received radio waves.

The known signal/data separator 104 separates the digitized OFDM signals to extract known signal sector and data signal sector separately, as described later. The data buffer 104a stores the data signal sector from the known signal/data separator 104. The equalizer 105 equalizes the data signal sector sent from the data buffer 104a based on the delay information 112 from the delay analyzer circuit 113 to output equalized data. The data demodulator 106 demodulates the equalized data to output demodulated signals 107. The known signal buffer 104b stores the known signal sector from the known signal/data separator 104.

The delay analyzer circuit 113 includes, as shown in FIG. 2, a known signal demodulator circuit 108, a divider 109, a delay analytical calculation circuit 110, and a database 111. As described later, the delay analyzer circuit 113 calculates the delayed radio wave information or delay information 112 based on the known signal sector from the known signal buffer 104b. The database 111 stores the known signal information S0 that is indicative of the known signal 10 before transmission.

The operation of the present embodiment is described by referring to FIG. 1 to FIG. 7. The receiver 101 shown in FIG. 1 receives multiplexed radio waves by the receiver antenna and converts the RF band OFDM signals in the multiplexed radio waves into the base band OFDM signals. Then the analog-to-digital converter 102 converts the base band OFDM signals into digitized OFDM signals.

Next, the matched filter 120 of the synchronizer circuit 103 shown in FIG. 4A receives, as input, both the digitized OFDM signals from the analog-to-digital converter 102 and the guard interval signal of the known signal from the memory 121. The matched filter 120 correlates these signals to output filter output as the correlative values. In the following description, as shown in FIG. 3A, a typical example is described wherein the receiving radio waves #1 through #3 arrive as multiplexed radio waves with different delays.

Figure 4B:
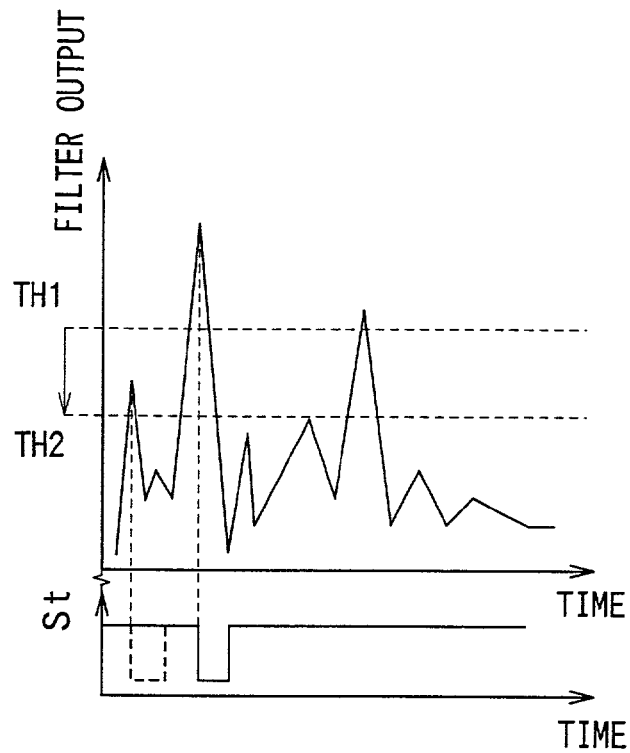
Figure 5:
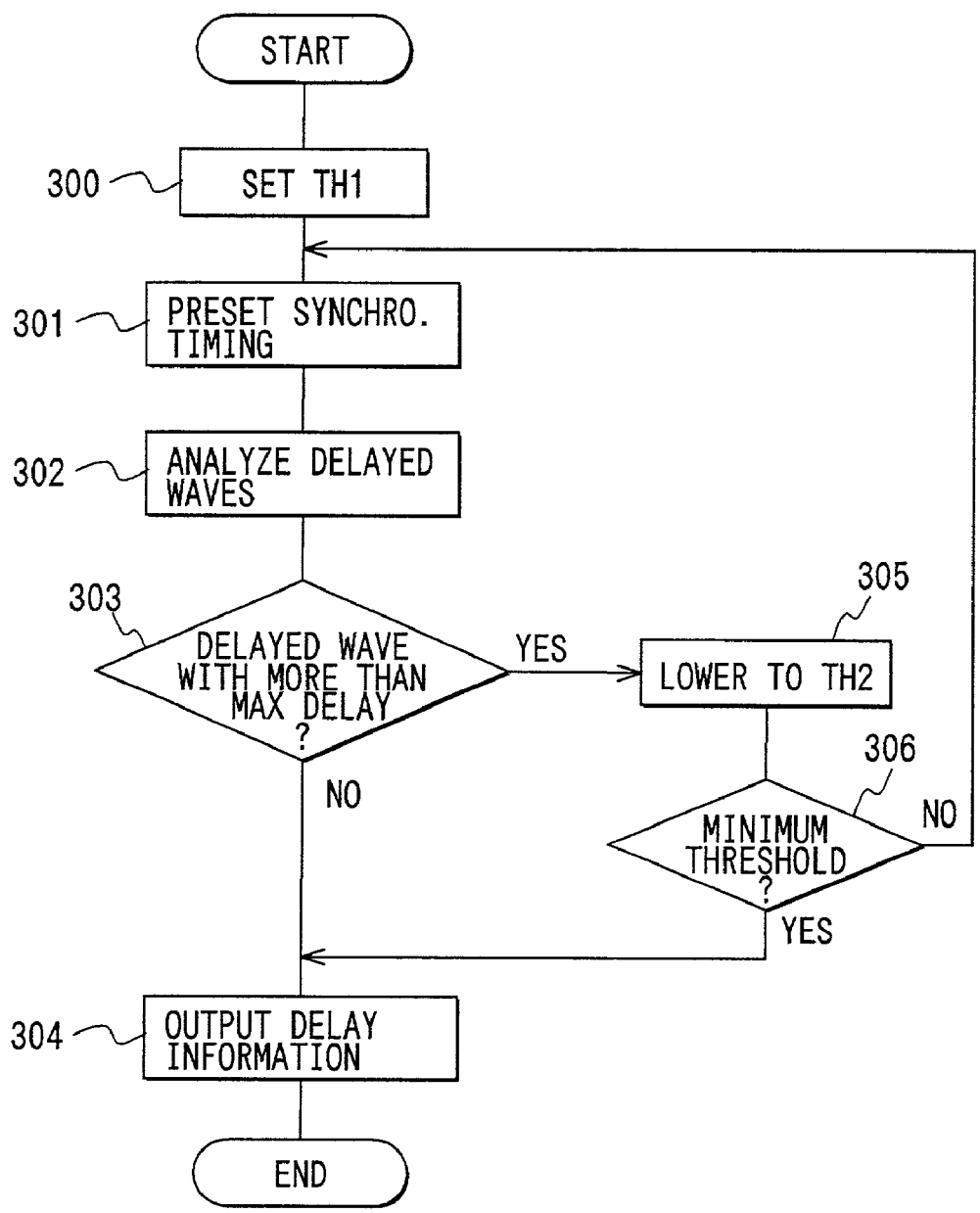
FIG. 5 is a flow chart showing a part of operation of the first embodiment of the present invention.

The digitized OFDM signals are signals based on the multiplexed signals as have been described above, which includes the guard interval of known signals in respective receiving radio waves #1 to #3. Therefore, the filter output from the matched filter 120 shows a plurality of acute peaks in the time domain (for example, three peaks) as shown in FIG. 4B.

Next, in the discriminator circuit 122, first threshold TH1 is set (step 300) to compare the filter output of the matched filter 120 with the first threshold TH1. Based on the result obtained from the comparison, as shown in FIG. 4B, the discriminator circuit 122 presets the time (timing) that the filter output becomes first larger value than the first threshold TH1 as the synchronization timing (step 301). It outputs the synchronization timing signal St that goes low at the synchronization timing to the known signal/data separator 104. The correlative memory 122a at this point stores the filter output of the matched filter 120.

Figure 3B:
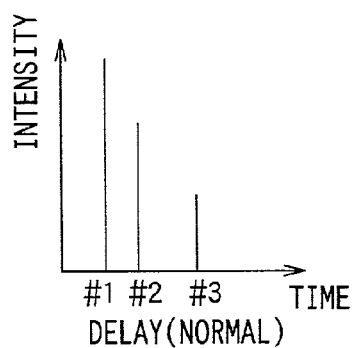

In the example shown in FIG. 3B, the radio wave #1 of the receiving radio waves #1 to #3 is first received. The filter output of the matched filter 120 derived from the radio wave #1 is larger than the first threshold TH1. Therefore, as shown in FIG. 3A, the leading point of the radio wave #1 is set as the synchronization timing.

Next, the known signal/data separator 104, which has timing information indicative of the time of known signals, separates the known signal/data in the digitized OFDM signals by means of this timing information as well as the synchronization timing signal St. In the example shown in FIG. 3A, as have been described above as the leading point of the radio wave #1 has been set as the synchronization timing, the leading edge of the guard interval of the data-1 signal is used as the reference to output the known signal sector (leading part) of the digitized OFDM signals to the known signal buffer 104b. At the same time the leading edge of the guard interval of the data-1 signal is also used as the reference to output the data signal sector (trailing part) of the digitized OFDM signal to the data buffer 104a.

In the example shown in FIG. 3A, the known signal sector of the digitized OFDM signal is the leading part of the receiving radio waves #1 to #3 by using the leading edge of the guard interval of the data-1 signal as a reference. On the other hand, the data signal sector of the digitized OFDM signal is the trailing part of the receiving radio waves #1 to #3 by using the leading edge of the guard interval of the data-1 signal as a reference.

Next, in the data buffer 104a, the data signal sector of the digitized OFDM signal is stored. In the known signal buffer 104b, the known signal sector of the digitized OFDM signal is stored. The known signal demodulator circuit 108 of the delay analyzer circuit 113 uses the known signal sector of the digitized OFDM signal stored in the known signal buffer 104b to demodulate OFDM to output demodulated signal Sr in the data sector of the known signal.

At this point, the part of the digitized OFDM signal used in the known signal demodulator circuit 108 for the OFDM demodulation is described now (referred to as "the part used for the analysis"). In the example shown in FIG. 3A, since the synchronization timing is set to the leading edge of the radio wave #1, the part used for the analysis can be matched precisely to the data sector of the known signal in the radio wave #1. In the radio waves #2 and #3, which have longer delays than the radio wave #1, respectively, the part used for the analysis can be matched precisely to a part of the data sector of the known signal, even with part of guard interval of the known signal being included, without including the guard interval of the data signal.

Figure 7A:
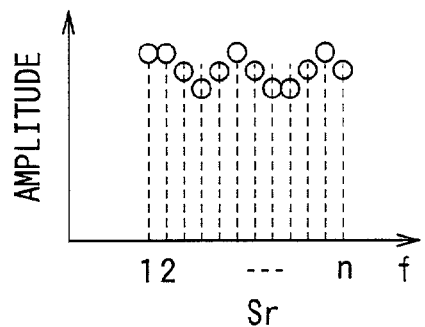
FIGS. 7A to 7F are graphs showing amplitude of N sub-carriers in the demodulated signal, phase of N sub-carriers in the demodulated signal, amplitude of N sub-carriers in the known signal, amplitude of N sub-carriers in the demodulated signal, amplitude of N sub-carriers in a computation result of the amount of shift Sa, and amplitude of N sub-carriers in the computation result of the amount of shift, respectively.
Figure 7B:
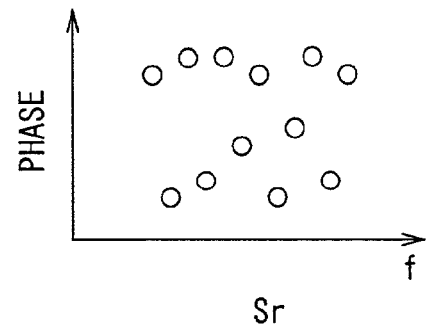
Figure 7C:
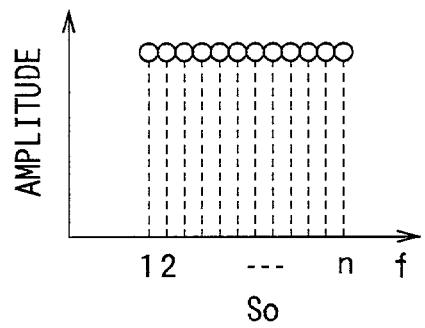
Figure 7D:
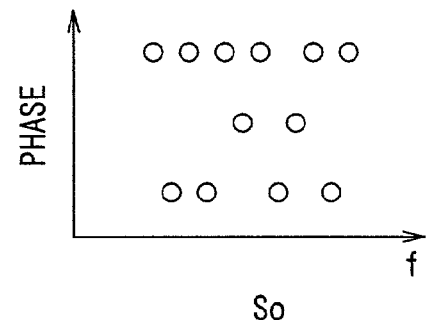
Figure 7E:
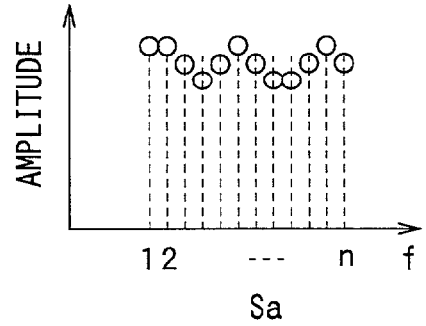

Then, the divider 109 performs a complex division of the demodulated signal Sr. The complex division performed by the divider 109 is described with reference to FIGS. 7A to 7F. Since the known signal 10 has been received with N sub-carriers as have been described above, the amplitudes of N sub-carriers in the demodulated signal Sr (FIG. 7A) fluctuate with respect to the amplitudes of N sub-carriers in the known signal So before transmission (FIG. 7C). In addition, the phase shift of the N sub-carrier of the demodulated signal Sr (FIG. 7B), fluctuates with respect to the phase of N sub-carriers in the known signal So before transmission (FIG. 7D). On the other hand, the database 111 shown in FIG. 2 stores the known signal So before transmission.

Figure 7F:
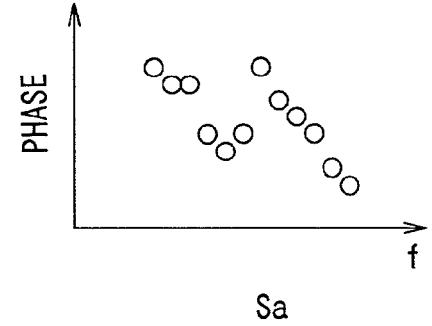

The divider 109, then, performs a complex division of the demodulated signal Sr with the known signal So before transmission stored in the database 111 for each of sub-carriers (from 1 to N). This allows obtaining the fluctuation result Sa as the fluctuation (shift) of phase and amplitude for each of sub-carriers (from 1 to N) in the known signal 10 (the frequency dependency of the phase and amplitude) (FIG. 7F). That is, in the known signal sector of the known signal 10, the complex division in this step determines the shift of the phase and amplitude in the known signal 10 for each frequency of the sub-carriers.

Next, the delay analytical calculation circuit 110 analyzes the delayed wave by means of the fluctuation result Sa for each of sub-carriers (from 1 to N) (step 302). The methods suitable for analyzing the delayed waves include, for example, ESPRIT method (c.f., the adaptive signal processing using an array antenna, by Nobuyoshi Kikuma, published by kagaku-gijutu-shuppan, Japan). Thus, The fluctuation result Sa for each of sub-carriers (from 1 to N) is used in the ESPRIT method to analyze the delay to determine the delay information 112. For the delay information 112 the delay time for each of receiving radio waves (delayed radio waves) constituting the above multiplexed radio wave as well as receiving power is determined.

Next, in the delay analytical calculation circuit 110, it is determined whether or not there is present receiving radio wave (delayed wave) having a delay longer than the preset delay (the maximum delay estimated in the wireless communication environment) in accordance with the delay information 112 (step 303). If there is not receiving radio waves of delay larger than the preset delay, then the delay information 112 is output (step 304). This indicates that the synchronization timing is set to the leading edge of the radio wave #1 that has arrived at first of the multiplexed radio waves, from the delay information 112 of the ESPRIT method.

Figure 6A:
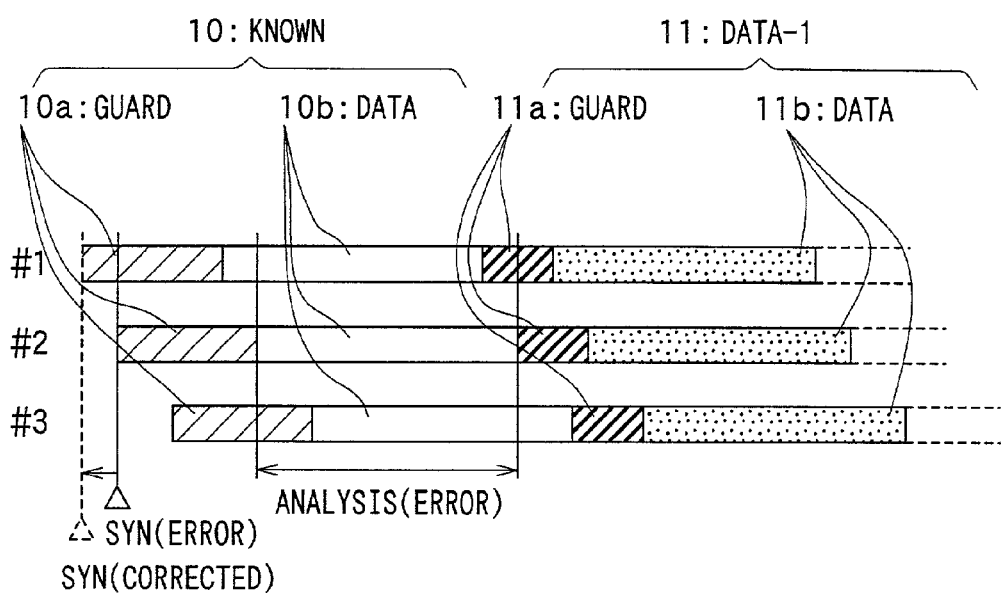
FIGS. 6A to 6C are a schematic diagram showing the data structure and delay waves of OFDM signals, and timing charts indicating delayed waves, respectively.
Figure 6B:
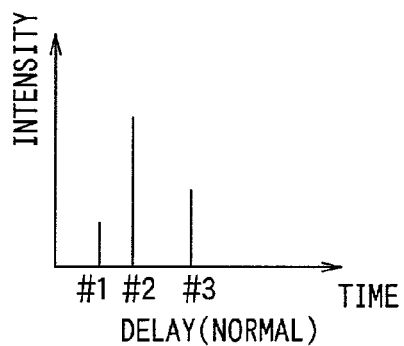
Figure 6C:
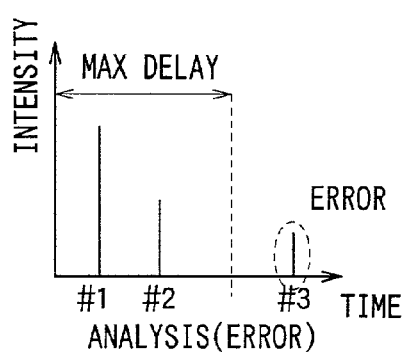

On the other hand, if the delay analytical calculation circuit 110 as shown in FIG. 6C determines that there is present radio wave having longer delay than the preset delay (step 304), then the erroneous setting of synchronization timing is concluded as the delay information 112 of the ESPRIT method. For example, when the first threshold TH1 is larger than the receiving power intensity of the radio wave #1 as well as the receiving power intensity of the radio wave #2 (correlative value) is larger than the receiving power intensity of the radio waves #1 and #3, as shown in FIG. 6B, the synchronization timing is set by the radio wave #2. Thus, as shown in FIG. 6A, part of the guard interval of the data signal in the radio wave #1 is included in the part used for the analysis.

In this case, in the step 303, the delay analytical calculation circuit 110 determines that there is present radio wave having larger delay than the preset delay based on the delay information 112 (FIG. 6B). The discriminator circuit 122 of the synchronizer circuit 103 proceeds to next step to alter the threshold to second one TH2 by lowering the first threshold TH1 by a predetermined amount (step 305). Then the discriminator circuit 122 determines whether or not the second threshold TH2 reaches the presettable minimum value (step 306).

Next, if the second threshold TH2 does not reach the presettable minimum value, the discriminator circuit 122 compensates for the synchronization timing. More specifically, the discriminator circuit 122 reads out the filter output of the matched filter 120 from the correlative memory 122a to compare the filter output of the matched filter 120 with the second threshold TH2. As a result, the time (timing) at which the filter output becomes firstly a larger value than the second threshold TH2 is set to the corrected synchronization timing (step 301). Therefore, as shown in FIG. 4B, the corrected synchronization timing is set so as to be in advance from the previously set synchronization timing.

Next, the delay analyzer circuit 113 performs again the delay analysis (step 302). More specifically, the known signal demodulator circuit 108 reads out the known signal sector from the known signal buffer 104b to set the corrected synchronization timing as the leading timing of the known signal sector. That is, the known signal demodulator circuit 108 sets the corrected synchronization timing as the point of starting demodulation of the known signal sector to determine demodulated signal Sr in correspondence with the known signal sector thus set.

Next, the delay analyzer circuit 113 determines the computational result of the amount of shift Sa of the phase and amplitude in each of sub-carriers (from 1 to N) in the known signal 10 in correspondence with the demodulated signal Sr and the known signal So of the database 111 (step 109). The delay analyzer circuit 113 performs again a delay analysis based on the ESPRIT method in response to the computation result of the amount of shift Sa (step 302). Thereafter, the processes in steps 303 to 304 are again performed to obtain precisely the delay information 112 in a manner similar to the previous example.

Next, the equalizer 105 equalizes the data signal based on the data signal sector of the digital OFDM signals and the delay information 112 to output equalized data. For example, when radio waves #1 to #3 arrive as multiplexed radio wave of three radio waves, the data signal sector of the digitized OFDM signals includes the data section 13 of the data signal in each of receiving radio waves #1 to #3. Here, delays for each of receiving radio waves #1 to #3 is obtained for the delay information 112 derived from the delay analyzer circuit 113. That is, for the delay information 112, the delay t1 of the radio wave #2 with respect to the radio wave #1 (FIG. 3A) and the delay t2 of the radio wave #3 with respect to the radio wave #1 (FIG. 3A) is obtained.

Then, the equalizer 105 separates the data signal sector of the digitized OFDM signals to signals for each sub-carrier, by using a method used in an equalizer as well as a demodulator of generic OFDM system, such as FFT (fast Fourier transform). These signals is referenced here as A1, A2, A3, . . . An. The corresponding sub-carrier frequencies are referred to as f1, f2, f3, . . . , fn hereinbelow. The receiving power intensity (strength) of the receiving radio waves (delayed waves) obtained by the above method #1 to #3 is referred to as M1, M2, and M3, and the delays of radio waves #1 to #3 are referred to as ta1, ta2, and ta3, respectively.

The equalizer 105 performs the following computation (equation [1]) for each separate sub-carrier to generate equalized signals A1', A2', A3', . . . , An'.

$$Ai' = Ai/[M1 \cdot \exp(2\pi f1 \cdot ta1) + M2 \cdot \exp(2\pi f2 \cdot ta2) + M3 \cdot \exp(2\pi f3 \cdot ta3)], \text{ where } i = 1, 2, 3, \ldots, n. \quad \text{[Equation 1]}$$

This calculation concludes signals for each sub-carrier of the receiving radio waves #1 to #3 arranged so as to match in the time domain to compensate for the influence of the delayed waves on the transmission path, or to equalize. In the above example, there are cited three radio waves, a similar computation is used for more than three radio waves to obtain the same result.

Next, the data demodulator 106 OFDM demodulates the equalized data from the equalizer 105 to output the demodulated signal 107. The demodulated signal 107 is signal-modulated by one of modulation methods consisted of QPSK modulation, 16-QAM modulation, and 64-QAM modulation. The modulation method is indicated in part of the known signal 10. The data demodulator 106 recognize the modulation method indicated in part of the known signal 10 to correspondingly demodulate the demodulated signal 107 in accordance with thus recognized modulation method.

In accordance with the first embodiment of the present invention, the delay information 112 is easily obtained by using the delay analyzer circuit 113 to analyze delays. That is, the communication device determines delay and receiving power for each of receiving radio waves as the delay information (delay information of the receiving radio waves) 111 even when the radio waves arrive with different delays and the delay of those receiving radio waves is longer than the period of time of the guard interval Tgp. The delay analysis in the delay analyzer circuit 113 uses the data sector 11 of the known signal, which is part of OFDM signals, so that the data structure of the OFDM signals needs not to be altered for the purpose of the delay analysis. In addition, when delayed radio waves arrive at different delays, the delay analytical calculation circuit 110 sets the synchronization timing based on the radio wave that has arrived first to determine the demodulated signal Sr in correspondence with the synchronization timing to analyze delays based on the demodulated signal Sr so that the delay analysis is performed at a higher precision.

The equalizer 105 further determines the equalized data based on the delay information 112, while at the same time the data demodulator 106 determines the demodulated data based on this equalized data, so that the demodulated data of higher precision is obtained.

In the first embodiment, there has been presented an example having N sub-carriers of OFDM signals arranged on the frequency axis at a regular interval. There can be a case in which carrier hole is used as OFDM signals. The process performed in the delay analyzer circuit 113 when the carrier hole is present is described with reference to FIG. 8 below.

In the frequency interval between N sub-carriers, if the frequency intervals except for the frequency interval between given two sub-carriers are regularly placed, the gap between the given two sub-carriers is referred to as a carrier hole. In the example shown in FIGS. 8A and 8B, there is shown a typical example of carrier hole present at the center of the series of N sub-carriers, on the frequency axis. That is, with respect to the frequency intervals of N sub-carriers, the frequency intervals are all identical except for the frequency interval between those two sub-carriers placed next to the center. The frequency interval between those two sub-carriers next to the center frequency is twice of other frequency intervals. More specifically, in the modulating frequency band, no signal is added to the sub-carrier at the center among the series of N sub-carriers.

Figure 8A:
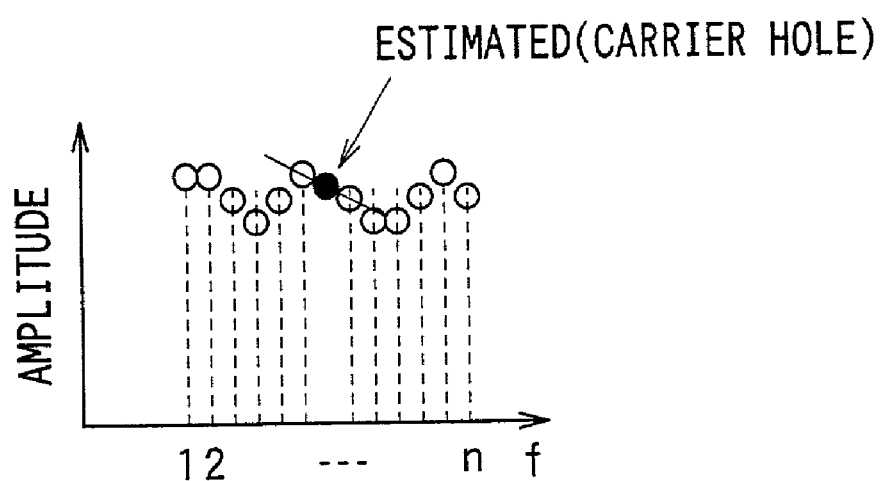
FIGS. 8A and 8B are graphs showing amplitude and phase according to a computation result of the amount of shift when a carrier hole is present.
Figure 8B:
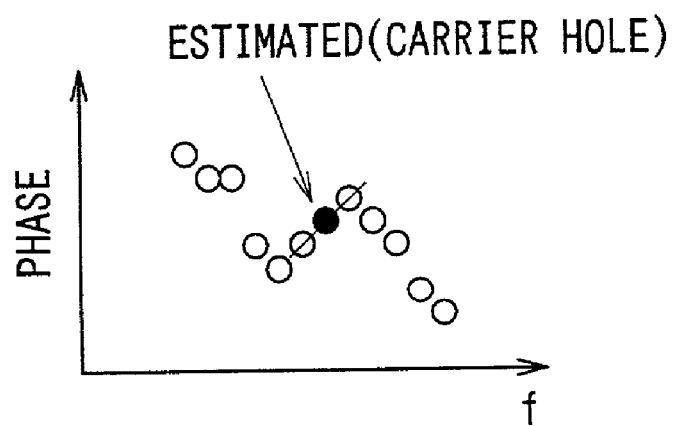

It is preferable to use the fluctuation result Sa of each of the sub-carriers placed at a regular interval on the frequency axis for the delay analysis by the delay analyzer circuit 113. Therefore, when there is present a carrier hole, the delay analyzer circuit 113 estimates the computation result of the amount of shift Sa of the part corresponding to the carrier hole in response to the fluctuation result Sa of the sub-carriers (from 1 to N). More specifically, the amount of amplitude shift for those two sub-carriers immediately next to the carrier hole is used to determine the amount of amplitude shift at the part corresponding to the carrier hole by for example the linear interpolation as shown in FIG. 8A. The amount of phase shift for those two sub-carriers immediately next to the carrier hole is used to determine the amount of phase shift at the part corresponding to the carrier hole by for example the linear interpolation as shown in FIG. 8B. The computation result of the amount of shift Sa for each of sub-carriers placed at a regular interval on the frequency axis is obtained thereby, even when there is present a carrier hole.

When a carrier hole is present, instead of estimating the computation result of the amount of shift Sa of the part corresponding to the carrier hole, a computation result of the amount of shift Sa is obtained for each of sub-carriers at the low frequency side of the carrier hole among the N sub-carriers as well as the computation result of the amount of shift Sa is obtained for each of sub-carriers at the high frequency side of the carrier hole amount the N sub-carriers.

Figures 9A, 9B:
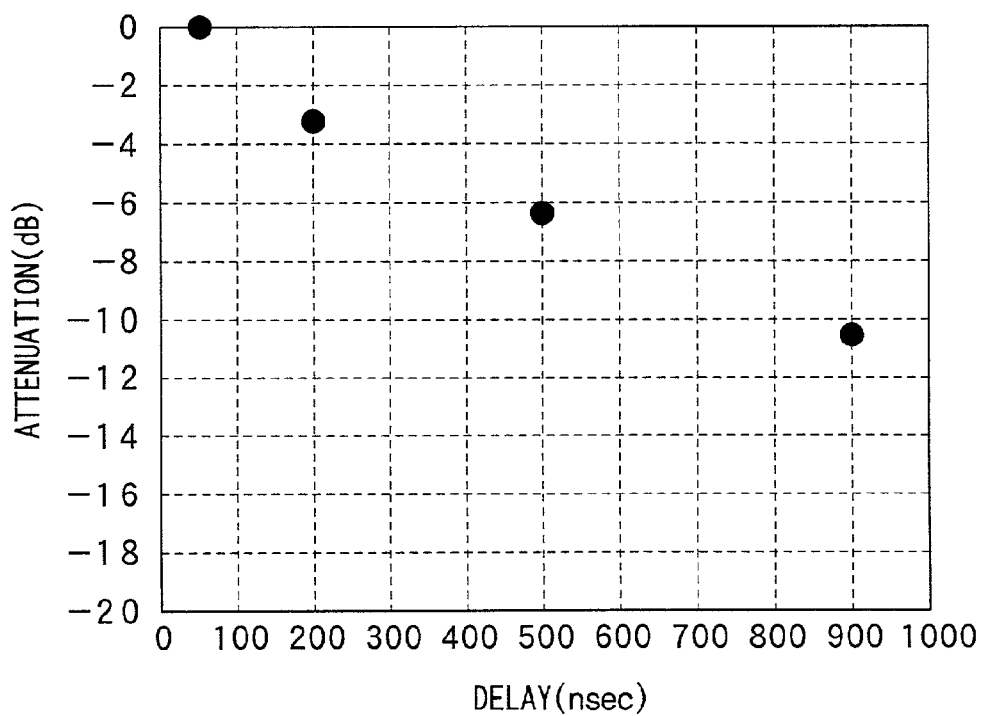
FIGS. 9A and 9b are graphs showing a simulation of delay analysis.

The inventors have conducted a simulation of the delay analyzer circuit 113 in accordance with the first embodiment and found the following result. The simulation was conducted as shown in FIG. 9A. That is, a multiplexed radio wave consisted of a direct propagation, delayed wave 1, delayed wave 2, delayed wave 3 was received. The transmission path of the wireless communication used in the experiment (hypothetical transmission line) was set so as to have the following characteristics of delay of 50 ns for the direct propagation, delay of 200 ns for the delayed wave 1, delay of 500 ns for the delayed wave 2, delay of 900 ns for the delayed wave 3, the power attenuation of 0 dB for the direct propagation, power attenuation of −3 dB for the delayed wave 1, power attenuation of −6 dB for the delayed wave 2, and power attenuation of −10 dB for the delayed wave 3.

According to the result of experiment, as shown in FIG. 9B, the accurate delays and power attenuation (receiving power levels) for the direct propagation, delayed wave 1, delayed wave 2, delayed wave 3 were obtained.

In the first embodiment, although an example has been described using the ESPRIT method for the delay analysis, other method such as MUSIC method (c.f., the adaptive signal processing using an array antenna, by Nobuyoshi Kikuma, published by kagaku-gijutu-shuppan, Japan) may be used instead.

[Second Embodiment]

In the second embodiment, an example is described in which the length (time) of guard interval is optimized by using the computation result of the amount of shift Sa as described in the first embodiment in order to transmit the OFDM signals. In the second embodiment, the data structure of the OFDM signals shown in FIG. 11 is used instead of the data structure shown in FIG. 3.

Figure 3C:
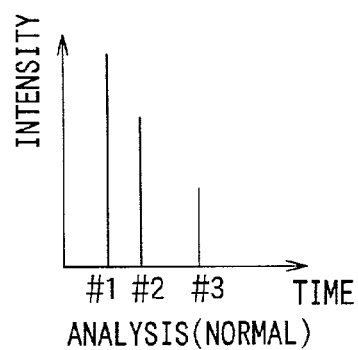
Figure 11:
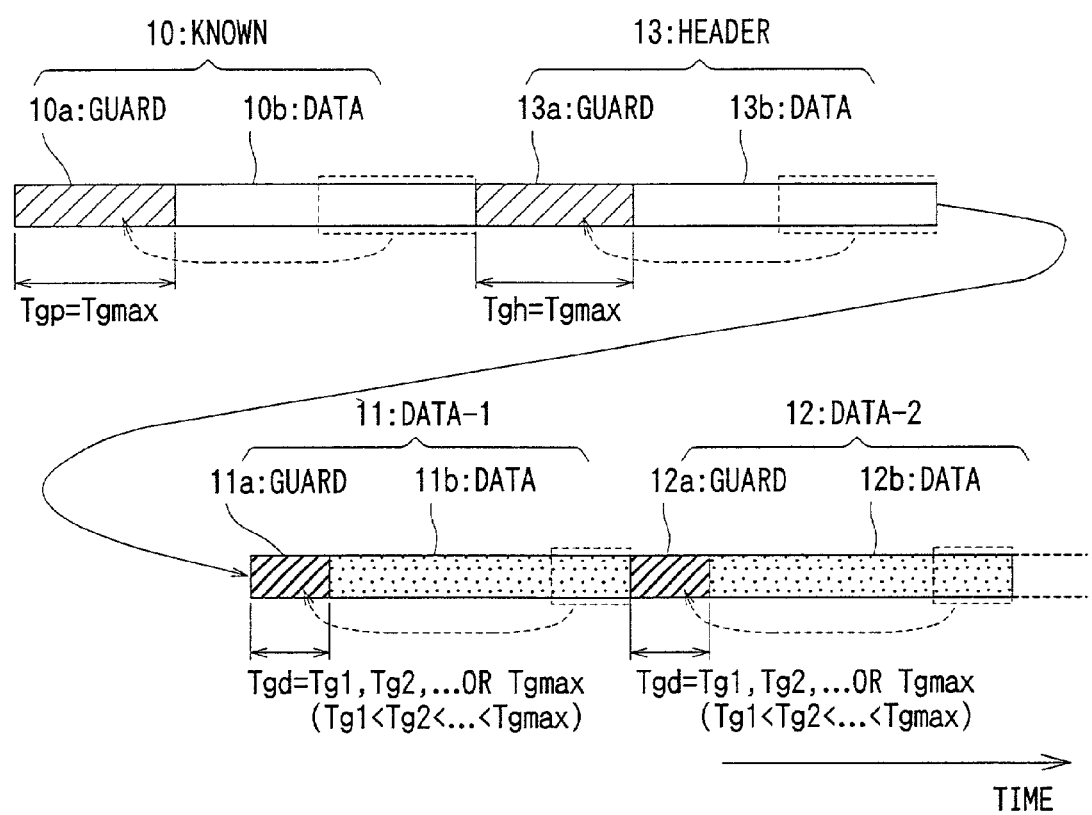
FIG. 11 is a diagram showing a data structure in accordance with the second embodiment of the present invention.

In the OFDM signal shown in FIG. 11, a header 13 is added to the data structure shown in FIG. 3. The header 13 is placed between the known signal 10 and the data-1 signal 11. The header 13 has a header guard interval 13a placed at the leader of data sector. Other structure is the same as the data structure shown in FIG. 3. In FIG. 11, data-2 signal 11 is also shown, which signal is omitted in FIG. 3.

Figure 10:
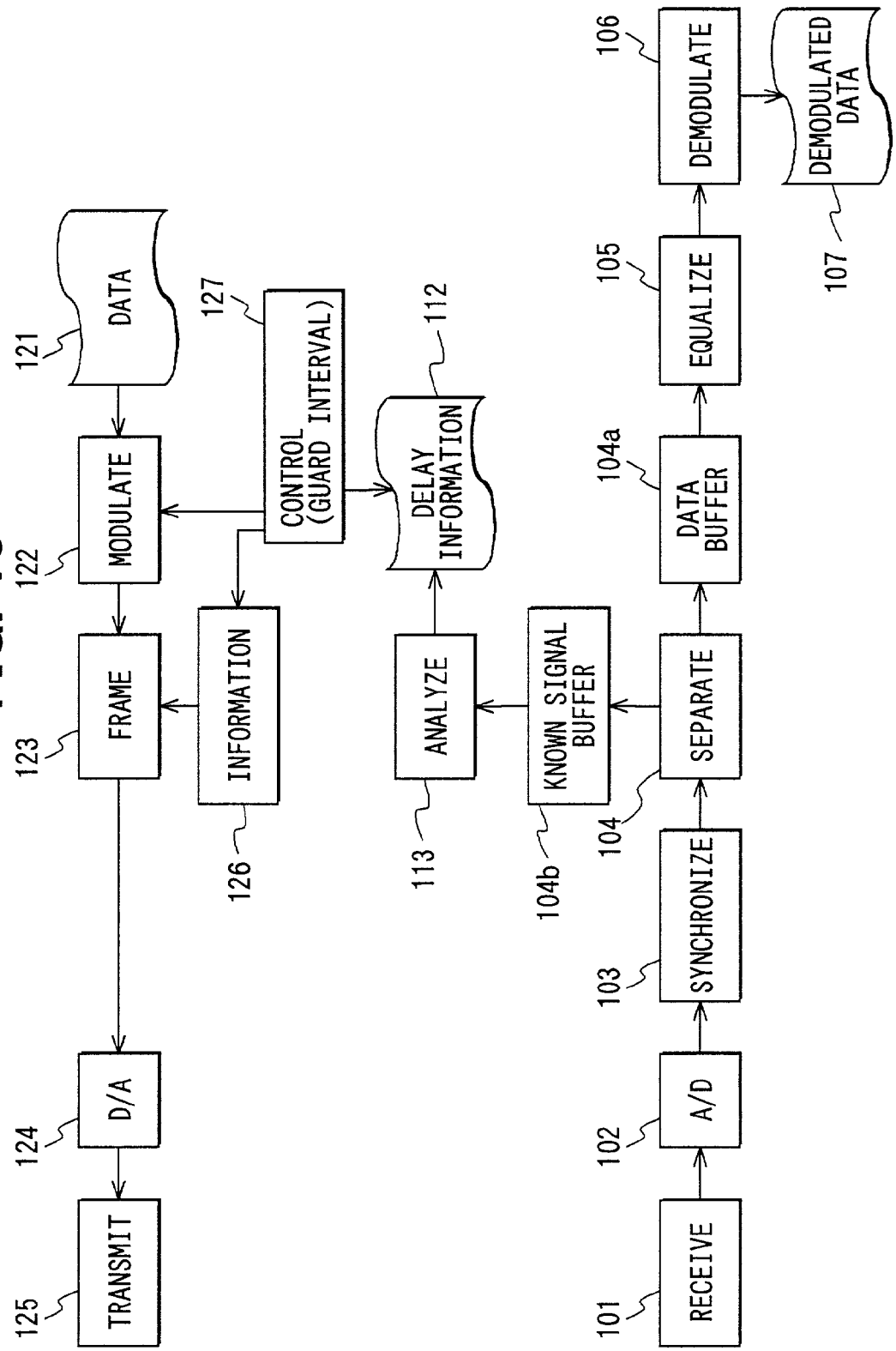
FIG. 10 is a schematic block diagram showing a circuitry in a communication device in accordance with the second embodiment of the present invention.

The communication device in accordance with the second embodiment includes, as shown in FIG. 10, a data modulator circuit 122, a synthetic frame generator circuit 123, a digital-to-analog converter 124, a transmitter 125, a known information generator circuit 126, and a controller circuit 127, in addition to the arrangement shown in FIG. 1. The data modulator circuit 122 performs the OFDM modulation of the transmission data 121 under the control of the controller circuit 127.

More specifically, the data modulator circuit 122 generates the header 13 as well as the data signals such as data-1 signal 11 and data-2 signal 12. The data-1 signal 11 and the data-2 signal 12 are generated from the transmission data 121 by the OFDM modulation. The guard interval 11a of the data-1 signal 11 is a copy of part of the data section 11b of the data-1 signal 11, while the guard interval 12a of the data-2 signal 12 is a copy of part of the data section 12b of the data-2 signal 12. The data section 13b of the header 13 includes data concerning the guard interval time Tgd of the data signal. The 20 header guard interval 13a is a copy of part of the data section 13b of the header. The time Tgd including the guard interval 11a and the guard interval 12a together with the guard interval time of header Tgh and the guard interval time Tgp of the known signal are set under the control of the controller circuit 127.

The known information generator circuit 126 generates the known signal 10 and the synthetic frame generator circuit 123 generates a frame by combining the known signal 10 from the known information generator circuit 126 and the header 13 and the data signals (data-1 signal 11 and data-2 signal 12) from the data modulator circuit 122. In this manner the data structure of an OFDM signal shown in FIG. 11 can be composed. The digital-to-analog converter 124 D/A-converts the OFDM signals from the known information generator circuit 126 to output analog OFDM signals. The transmitter 125 converts the analog OFDM signals into the OFDM signals of RF band in order to transmit via an antenna.

Figure 13:
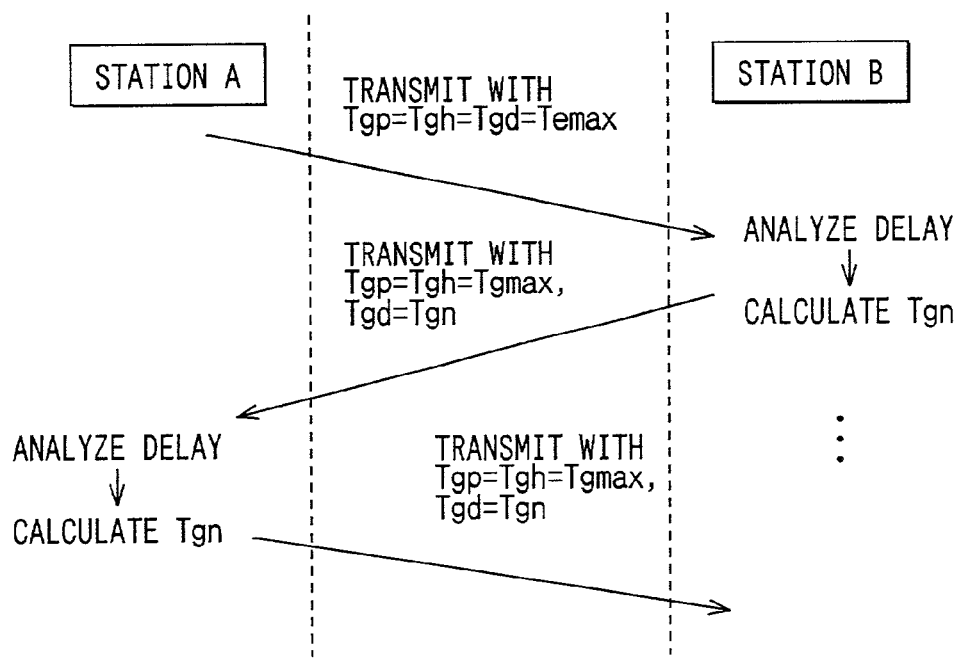
FIG. 13 is a diagram showing the operation of the second embodiment of the present invention.

The operation of the second embodiment of the present invention is described with reference to FIG. 13. The example includes wireless communication stations A and B, both having the communication device in accordance with the second embodiment applied. The stations A and B have the same arrangement.

The wireless station A transmits an OFDM signal with the time of guard interval Tgp of the known signal, the time Tgh of the header guard interval 13a, and the time Tgd of the guard interval of data signal all set to Tgmax (i.e., Tgp=Tgh=Tgd=Tgmax). The time Tgmax is set to more than the maximum delay previously estimated in the wireless communication environment.

It should be noted that the data section of the header 13 includes data concerning the time Tgd of the data signal guard interval (=Tgmax).

Then, the wireless station B analyzes delays from the known signal in the OFDM signal transmitted from the wireless station A to determine the optimum guard interval time Tgn for the guard interval time Tgd of the data signal. The guard interval of the data signal is set to the optimum time Tgd (Tgn=Tgd) according to the analysis result, and an OFDM signal having the guard interval time Tgp of the known signal and the time Tgh of the header guard interval 13a set to Tgmax (i.e., Tgp=Tgh=Tgmax) is transmitted. Here, the data section of the header 13 includes data concerning the guard interval time Tgd of the data signal (=optimum time Tgn).

Next, the wireless station A analyzes the delay according to the known signal in the OFDM signal sent from the station B to determine the optimum guard interval time Tgn for the guard interval time Tgd of the data signal. Then the guard interval of the data signal is set to the optimum time Tgd (i.e., Tgn=Tgd) according to the analysis result, and an OFDM signal having the guard interval time Tgp of the known signal and the time Tgh of the header guard interval 13a set to the time Tgmax (Tgp=Tgh=Tgmax). Here the data section of the header 13 includes data concerning the guard interval time Tgd of the data signal (=optimum time Tgn).

In the following description, the station A from among stations A and B is referred to for the explanation of more specific operation. The known information generator circuit 126, under the control of the controller circuit 127, sets the guard interval time Tgp of the known signal to the time Tgmax, then generates a guard interval 10b of thus set time Tgp (=Tgmax), and outputs the known signal 10 having this guard interval 10b to the synthetic frame generator circuit 123.

The data modulator circuit 122 under the control of the controller circuit 127 sets the guard interval time Tgd of data signals including the data-1 signal 11 and the data-2 signal 12 to time Tgmax, to generate data signals (data-1 signal 11, data-2 signal 12, and so on) having a guard interval of thus set time Tgd (=Tgmax). The data modulator circuit 122 under the control of the controller circuit 127 also sets the time Tgh of the header guard interval 13a to the time Tgmax and generates a header 13 having the guard interval of thus set Tgh (=Tgmax).

Next, the synthetic frame generator circuit 123 generates a frame by combining the header 13 and data signals (data-1 signal 11, data-2 signal 12 and so on) from the data modulator circuit 122 together with the known signal 10 from the known information generator circuit 126 to output digitized OFDM signals. The digital-to-analog converter 124 converts the digital OFDM signals into analog OFDM signals, and the transmitter 125 converts the analog OFDM signals into the OFDM signals of RF band in order to transmit via an antenna using the radio frequency wave as medium.

The receiver 101 receives the OFDM signals transmit from the wireless station B using the radio frequency wave as medium. The received OFDM signals are processed in a manner substantially identical to the steps in the first embodiment. However, the known signal/data separator 104 outputs the known signal sector in the digital OFDM signals as described in the first embodiment through the known signal buffer 104b to the delay analyzer circuit 113, and the data signal sector in the digital OFDM signals through the data buffer 104a to the equalizer 105. Here, the data signal sector, in accordance with the second embodiment, is indicative of the trailing part with reference to the forefront of the header 13 of the digital OFDM signal. The known signal sector is indicative of the leading part with reference to the forefront of the header 13 of the digital OFDM signal.

Next, the equalizer 105 determines the equalized data with the header 13 and data signals (data-1 signal 11, data-2 signal 12, and so on) in a manner substantially identical to the first embodiment, in response to the data signal sector of the digital OFDM signals, while the data demodulator circuit determines the time Tgd of the data signal guard interval by demodulating the data section 13b of the header to separate the data sector from within the data signal based on the guard interval time Tgd to OFDM demodulate to determine demodulated data.

Figure 12:
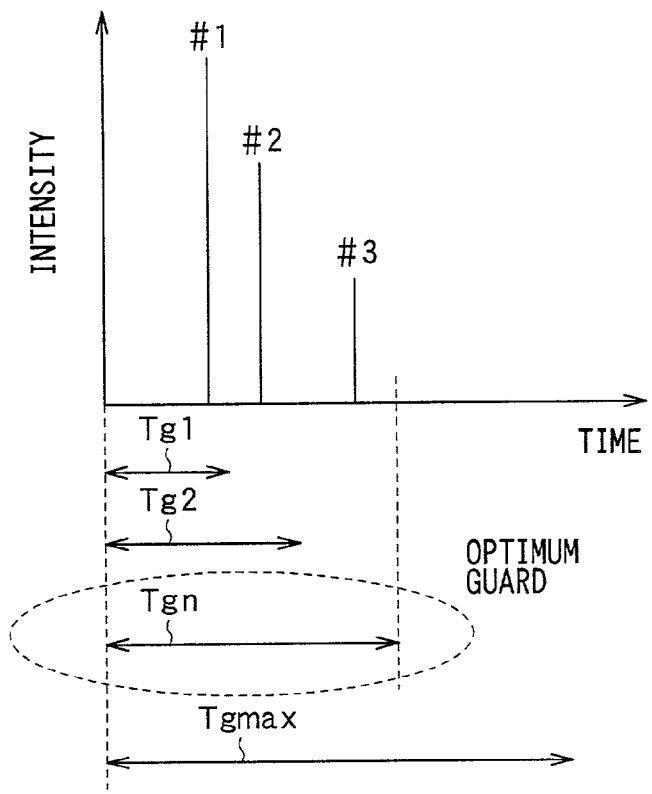
FIG. 12 is a graph showing an optimum guard interval in the second embodiment of the present invention.

Next, the delay analyzer circuit 113, in a manner substantially identical to the first embodiment, analyzes the delay waves to determine the delay information 112. The controller circuit 127 in turn sets the time Tgd of guard interval for the data signals (data-1 signal 11, data-2 signal 12 and so on) based on the delay information 112. The guard interval time Tgd, as shown in FIG. 13, is selected as the most appropriate time Tgn from within the Tg1, Tg2, . . . , Tgn, . . . , Tgmax (where Tg1<Tg2<, . . . , <Tgn<, . . . <Tgmax). The guard interval time Tgd (=Tgn) thus selected becomes the time longer than the delay of received radio waves #1 to #3 obtained from the delay information 112, as shown in FIG. 12.

Next, the data modulator circuit 122 under the control of the controller circuit 127 generates the data signals (data-1 signal 11, data-2 signal 12, and so on) having the guard interval of the most appropriate time Tgn (=Tgd). The data modulator circuit 122 under the control of the controller circuit 127 also generates a header 13 having the time Tgh of the header guard interval 13a set to the time Tgmax. Here, the header 13 contains data concerning the guard interval time Tgd (=Tgn) of the data signal. The known information generator circuit 126, which at that time is under the control of the controller circuit 127, generates the known signal 10 having the guard interval time Tgp set to the time Tgmax. The synthetic frame generator circuit 123 synthesizes a frame based on the header 13, data signals and the known signal 10 to output digital OFDM signals. The digital-to-analog converter 124 converts the digital OFDM signals into analog OFDM signals, and the transmitter 125 converts the analog OFDM signals into the OFDM signals of RF band to transmit via an antenna.

In accordance with the second embodiment, the guard interval time Tgd of the data signals is set so as to be longer than the maximum delay of receiving radio waves #1 to #3 in response to the delay information 112. Therefore, the guard interval time Tgd of data signals can be shortened when compared with the maximum delay time previously estimated in the wireless communication environment. This allows the transfer rate of the transmission data to increase to improve the transmission efficiency.

In addition, the guard interval time Tgp of the known signal is set to a value greater than the maximum delay previously estimated in the wireless communication environment, to prevent the demodulation of data sector of the known signals from being disabled due to the reception of the OFDM signals in a delay window far more longer than the guard interval 10a of the known signal. The guard interval time Tgh of the header also is set to a value greater than the maximum delay previously estimated in the wireless communication environment to prevent the demodulation of the data section 13b of the header from being disabled due to occurrence of unexpected delay.

In the second embodiment, the guard interval time Tgd (=Tgn) of the data signals (data-1 signal 11, data-2 signal 12, and so on) is set in accordance with the delay information 112. It is possible that the guard interval time Tgp of the known signals or the header guard interval time Tgh is set in correspondence with the delay information 112.

[Third Embodiment]

Figure 14:
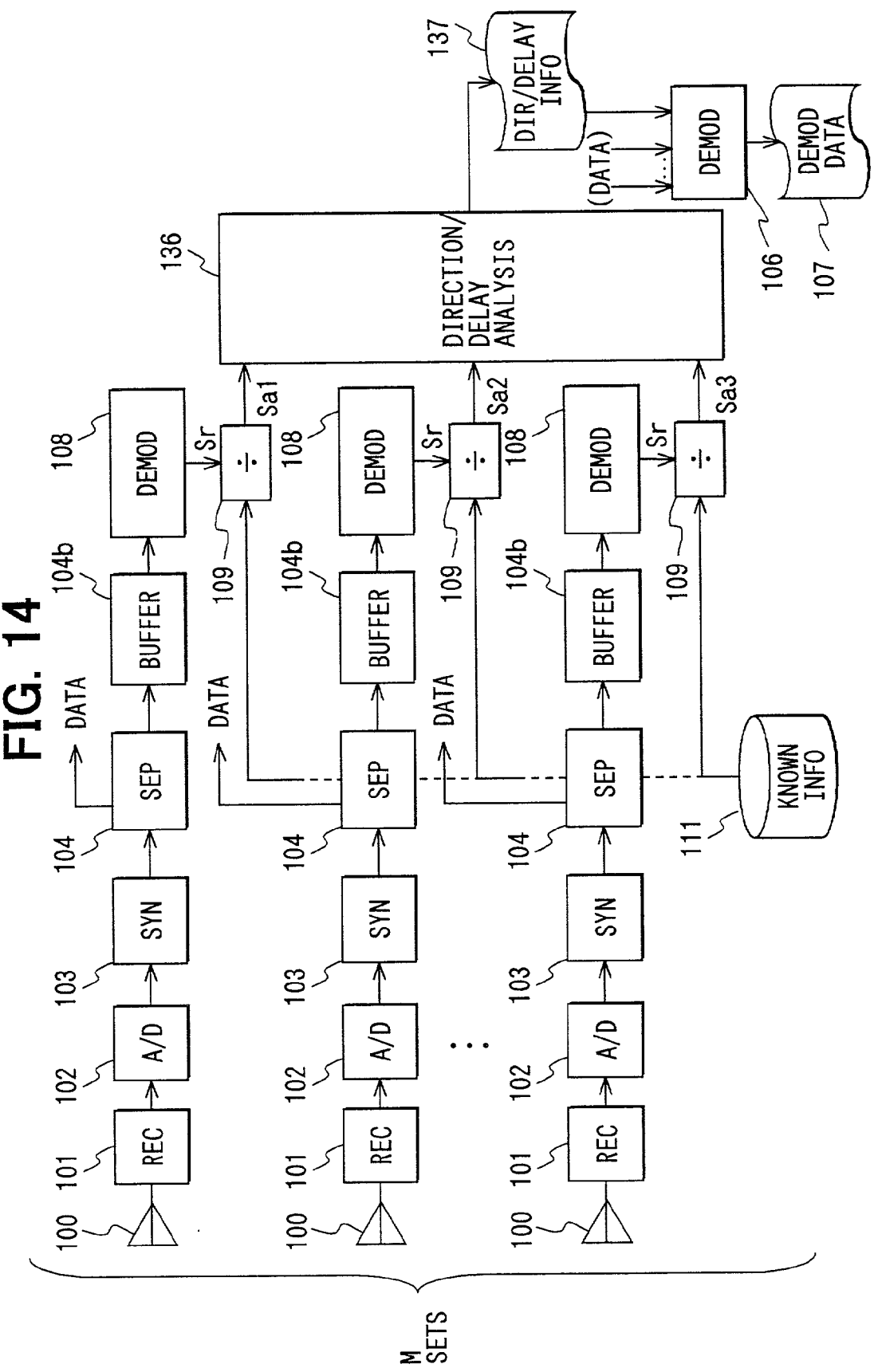
FIG. 14 is a schematic block diagram showing a circuitry in a communication device in accordance with the third embodiment of the present invention.

In the third embodiment, the arrival direction of each of the receiving radio waves in addition to the delay and receiving power of each of receiving radio waves is determined. FIG. 14 is the overview of this arrangement.

The communication device shown in FIG. 14 includes a plurality of (M) sets of: an antenna 100, a receiver 101, analog-to-digital converter 102, synchronizer circuit 103, known signal/data separator 104, known signal buffer 104b and divider 109, as well as a database 112, an arrival direction/delay analysis processing circuit 136, and a data demodulator circuit 106. In FIG. 14, the similar or substantially same members are designated with the identical reference numbers to FIG. 1 and FIG. 2. Each of M sets of antennas 100 has the identical characteristics sufficient to constitute an array antenna. Each of M sets of dividers 109 determines fluctuation results SA1, SA2, . . . , SAM, respectively. The database 112 stores the known signal information So indicative of the known signal before transmission 10, to be supplied to each of M sets of dividers 109.

In this communication device, the analysis processing circuit 126 has the fluctuation results SA1, SA2, . . . , SAM input from M sets of dividers 109. The analysis processing circuit 126 determines the arrival direction/delay wave information 137 by analyzing the delayed waves based on the fluctuation results SA1, SA2, . . . , SAM. This yields the receiving power, delay, arrival direction for each of receiving radio waves as the arrival direction/delay wave information 137. The delay analysis uses 2D Unitary ESPRIT (Institute of Electronics and Communication Engineers of Japan, IECEJ journal AP97-78).

The data demodulator 106 has, as input, the data signal sections of the digital OFDM signals from each of M sets of known signal/data separators 104, in addition to the arrival direction/delay wave information 137. In the data demodulator 106, the radio wave having the maximum receiving power among the receiving radio waves and its arrival direction are determined based on the data signal sectors of M sets of OFDM signals and also based on the arrival direction/delay wave information 137 to selectively extract the receiving radio wave of that arrival direction in order to perform the demodulation. The demodulated signal 107 of higher precision can be therefore obtained, thereby, allowing the transmission quality to further improve.

In the data demodulator 106, OFDM demodulation is performed by and after eliminating radio waves among receiving radio waves having longer delay than the data section 10b of the known signals based on the arrival direction/delay wave information 137 as well as the data signal sections of M sets of OFDM signals, instead of determining the arrival direction of the radio wave (delayed wave) having the maximum receiving power to selectively demodulate the radio wave of that arrival direction. This yields therefore demodulated signals 107 of higher precision, thereby allowing the transmission quality to further improve.

Furthermore, it is more preferable that, by applying the adaptive antenna technology which is a well-known technique in the art to the array antenna constituted of M sets of antennas 100 in the third embodiment, the amplitude and phase of the OFDM signals received by each of M sets of antennas 100 are optimally controlled so as to obtain a desired directivity in the M sets of antennas 100.

[Fourth Embodiment]

Figure 15:
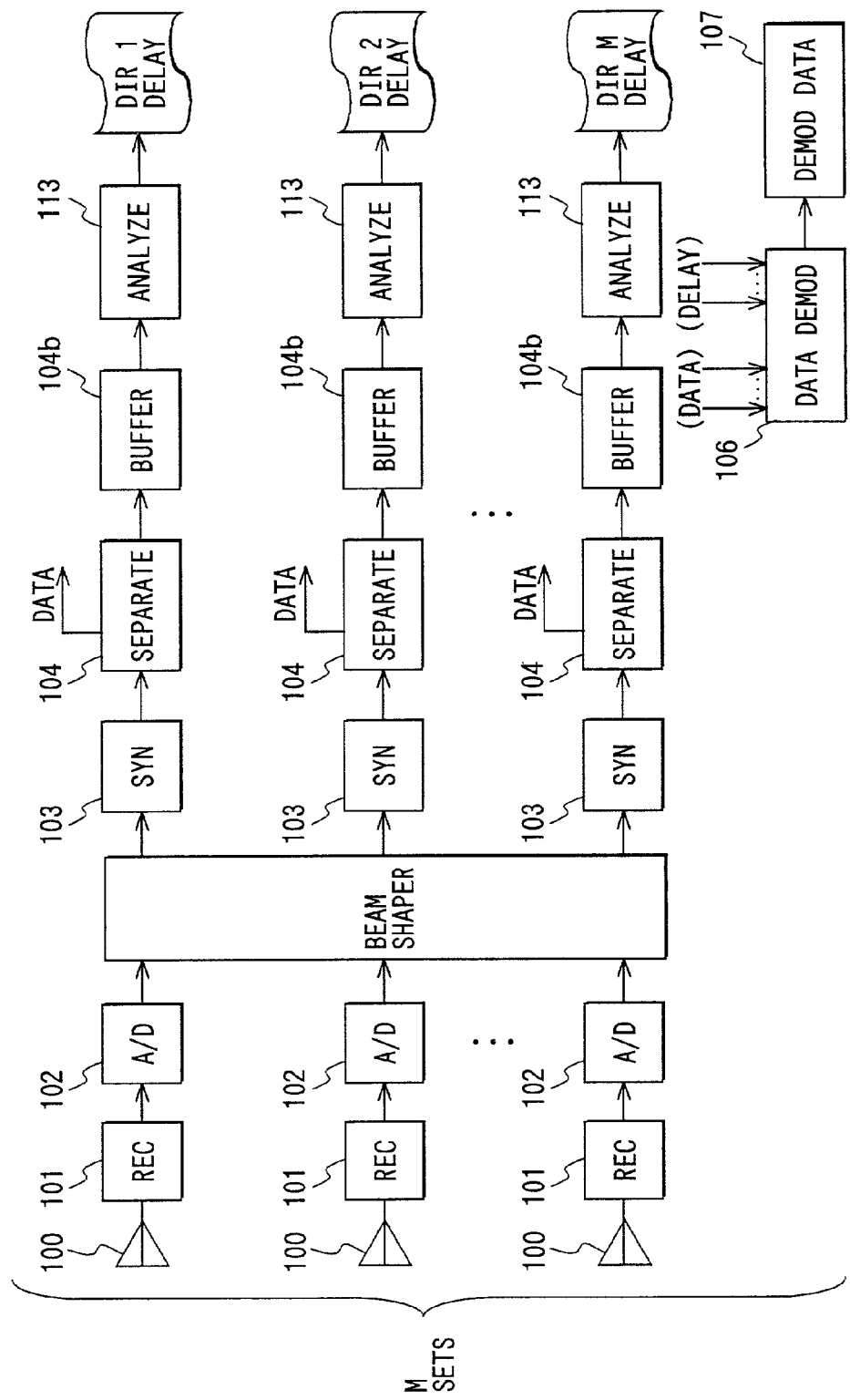
FIG. 15 is a schematic block diagram showing a circuitry in a communication device in accordance with the fourth embodiment of the present invention.

In the fourth embodiment, the OFDM signals received by each of M sets of antennas 100 is separated according to the arrival direction of signals to determine the delay information for each of separated direction based on thus extracted OFDM signals. FIG. 15 shows an exemplary configuration of such communication device.

In the communication device shown in FIG. 15, M sets (M is a plural number) of an antenna 100, a receiver 101, an analog-to-digital converter 102, a synchronizer circuit 103, a known signal/data separator 104, a known signal buffer 104b, and adelay analyzer circuit 113 are included, as well as abeam shaper 128. The beam shaper 128 uses FFT (fast Fourier transform) or MUSIC method (c.f., the adaptive signal processing using an array antenna, by Nobuyoshi Kikuma, published by kagaku-gijutu-shuppan, Japan). In FIG. 15, the similar or substantially same members as in FIG. 1 are designated with the identical reference numbers. However, each of M sets of antennas 100 has the same directivity. The beam shaper 128 is connected between M sets of analog-to-digital converters 102 and M sets of synchronizer circuits 103.

In this communication device, the beam shaper 128 has digital OFDM signals input from each of M sets of analog-to-digital converters 102, respectively. The beam shaper 128 separates the digital OFDM signals and isolate signals for each of arrival direction to output thus isolated OFDM signal to the corresponding synchronizer circuit 103. M sets of synchronizer circuits 103 thereby perform the process substantially identical to that in the first embodiment in correspondence with the isolated OFDM signals of each of arrival directions. Furthermore M sets of known signal/data separators 104 as well as M sets of delay analyzer circuits 113 performs the process substantially identical to that in the first embodiment for each set. In addition, each of M sets of delay analyzer circuits 113 determines the delay information for each arrival direction (direction 1, direction 2, . . . , direction M).

To the data demodulator 106, data signal sectors of M sets of OFDM signals as well as delay information for each arrival direction of M sets is input. The data demodulator 106 determines the arrival direction of the receiving radio wave having the maximum receiving power among receiving radio waves based on the data signal sectors of M sets of OFDM signals and the delay information of each of M sets of arrival directions to selectively perform the OFDM demodulation on the receiving radio wave of that arrival direction. Therefore, the demodulated signal 107 of higher precision is obtained, in a manner substantially identical to that of the third embodiment.

Instead of the above method, the data demodulator 106 eliminates the receiving radio waves having longer delay than the data section 10b of the known signal among the receiving radio waves to perform the OFDM demodulation on the remaining signals, based on the delay information for each of arrival directions (direction 1, direction 2, . . . , direction M), together with the data signal sectors of M sets of OFDM signals (from the known signal/data separators 104).

The OFDM signals output from the beam shaper 128 correspond to their arrival directions so that the signal of desireddirection is selectively demodulatedfor a given purpose.

Since the digital OFDM signals are isolated for each arrival direction by the beam shaper 128, the delay analyzer circuit 113 need not analyze the arrival direction of given signals so that the process is simplified when compared with the fourth embodiment.

[Fifth Embodiment]

Figure 16:
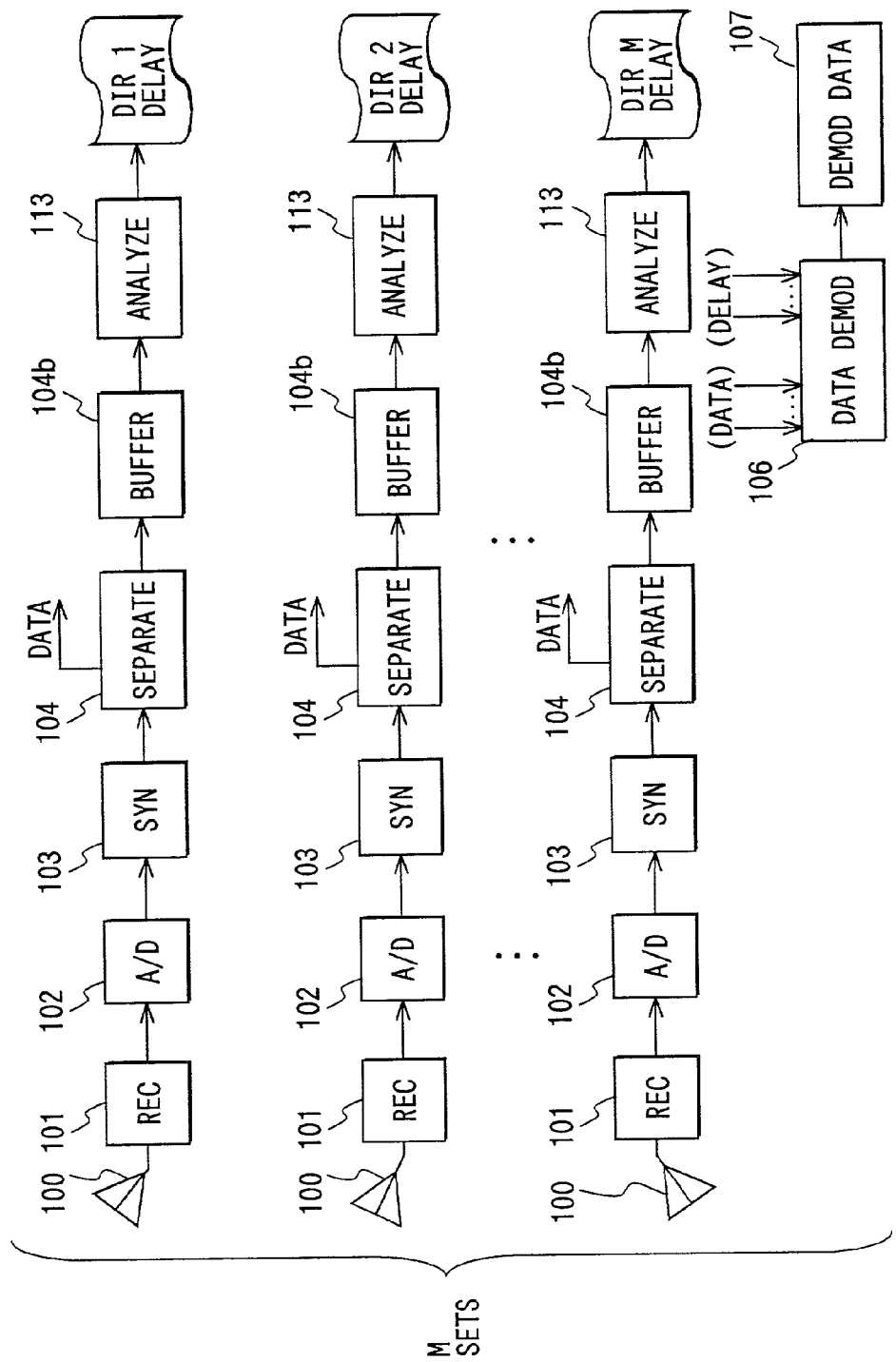
FIG. 16 is a schematic block diagram showing a circuitry in a communication device in accordance with the fifth embodiment of the present invention.

In the fifth embodiment, each of M sets of antennas has a different directivity to receive receiving radio waves for a given specific arrival direction. FIG. 16 shows an example of such arrangement of a communication device.

The communication device shown in FIG. 16 has M sets (m is a plural number) of an antenna 100, receiver 101, analog-to-digital converter 102, synchronizer circuit 103, known signal/data separator 104, known signal buffer 104b, and delay analyzer circuit 113, as well as a data demodulator 106.

In FIG. 16, the similar or substantially same members as in FIG. 1 are designated with the identical reference numbers.

In the fifth embodiment, each of M sets of antennas 100 has directivity different from each other. Each antenna 100 of M sets receives signals in a specific arrival direction corresponding to the directivity of that antenna. The receiver 101, analog-to-digital converter 102, synchronizer circuit 103, known signal/data separator 104 and delay analyzer circuit 113 in the same set performs the operation substantially similar to that described in the first embodiment. As a result, the delay analyzer circuit 113 determines the delay information for each arrival direction (direction 1, direction 2, . . . , direction M). The data demodulator 106 performs the operation similar to that in the fourth embodiment so that a substantially identical effect can be achieved to the fourth embodiment above.

By giving each antenna 100 of M sets of antennas directivity different from each other, the structure of antennas 100 is somewhat complicated, however the analysis of arrival direction is unnecessary so that the overall process (amount of computation) can be significantly decreased.

In the above embodiments, some exemplary configurations have been described in which the known signal 10 is carried on all of N sub-carriers and the amount of shift (fluctuation result Sa) of the phase and amplitude in the sub-carriers (from 1 to N) are determined. However, the present invention is not limited thereto. Other embodiments can be devised in which the known signal 10 is carried on K sub-carriers, which are more than two among N sub-carriers, and the amount of shift (fluctuation result Sa) of the phase and amplitude in each of k sub-carriers are determined to determine the delay information based on the amount of shift.

It is further understood by those skilled in the art that the present invention can be embodied in other specific forms without departing from the spirit or essential characteristics thereof.

For instance, the communication method may also be any of multiplexing carrier methods other than the orthogonal multiplexing carrier method. The communication device may be applied to an indoor communication environment where many radio wave obstacles are present. The communication device using the orthogonal multiplexing carrier method (or a multiplexing carrier method) can be applied to a variety of communication systems including surface wave digital broadcasting systems, on-the-road broadcasting systems, cellular phone systems, and wireless LAN systems.

What is claimed is:

1. A communication device using a communication method of simultaneously transmitting and receiving a plurality of N carriers to receive known signals by K ($\leq$N) carriers among the N carriers, the device comprising:

means for determining from the received known signals an amount of shift of amplitude and phase of each of the K carriers indicative of the known signal to determine delay information of receiving radio waves in response to thus determined amount of shift;

a detector for detecting a leading head of the receiving radio waves;

a timing determining unit for determining synchronization timing of the receiving radio waves based on detection by the detector;

a discriminator unit for determining whether the receiving radio waves have been received prior to the synchronization timing in response to the delay information;

a timing reconfiguration unit for reconfiguring the synchronization timing by means of the receiving radio waves received prior to the synchronization timing, when the discriminator unit determines that the receiving radio waves have been received prior to the synchronization timing; and a delay information recalculating unit for determining the delay information again in response to the reconfigured synchronization timing and the received signals.

2. The communication device according to claim 1, wherein:

the communication method is an orthogonal multiplexing carrier method.

* * * * *